(No Model.)

L. J. WOOLSEY.
CALENDAR.

No. 394,805.    Patented Dec. 18, 1888.

DECEMBER, 1886.

| | DAYS TO DATE. | DAYS TO DATE. | |
|---|---|---|---|
| WED. 1. | 30 TO DEC. 31, FRI.<br>60 TO JAN. 30, SUN.<br>90 TO MAR. 1, TUE. | 33 TO JAN. 3, MON.<br>63 TO FEB. 2, WED.<br>93 TO MAR. 4, FRI. | |
| THU. 2. | 30 TO JAN. 1, SAT.<br>60 TO JAN. 31, MON.<br>90 TO MAR. 2, WED. | 33 TO JAN. 4, TUE.<br>63 TO FEB. 3, THU.<br>93 TO MAR. 5, SAT. | |
| FRI. 3. | 30 TO JAN. 2, SUN.<br>60 TO FEB. 1, TUE.<br>90 TO MAR. 3, THU. | 33 TO JAN. 5, WED.<br>63 TO FEB. 4, FRI.<br>93 TO MAR. 6, SUN. | Fig. 1. |
| SAT. 4. | 30 TO JAN. 3, MON.<br>60 TO FEB. 2, WED.<br>90 TO MAR. 4, FRI. | 33 TO JAN. 6, THU.<br>63 TO FEB. 5, SAT.<br>93 TO MAR. 7, MON. | |

D  D     h  h  h  H     e  e  e  H

Fig. 2.

| SAT. 4. | 30 DAYS TO JAN. 3, MON.<br>60 DAYS TO FEB. 2, WED.<br>90 DAYS TO MAR. 4, FRI. |
|---|---|

D  D     h  h  h

Fig. 3.

| SAT. 4. | 33 DAYS TO JAN. 6, THU.<br>63 DAYS TO FEB. 5, SAT.<br>93 DAYS TO MAR. 7, MON. |
|---|---|

D  D     e  e  e

Fig. 4.

| 30 DAYS TO JAN. 3, MON.<br>60 DAYS TO FEB. 2, WED.<br>90 DAYS TO MAR. 4, FRI. | 33 DAYS TO JAN. 6, THU.<br>63 DAYS TO FEB. 5, SAT.<br>93 DAYS TO MAR. 7, MON. |
|---|---|

Witnesses:
Chas A. Clark.
Joseph H. Snow.

Inventor:
L. J. Woolsey

United States Patent Office.

L. JEROME WOOLSEY, OF EGYPT, NEW YORK.

CALENDAR.

SPECIFICATION forming part of Letters Patent No. 394,805, dated December 18, 1888.

Application filed October 13, 1886. Serial No. 216,185. (No model.)

*To all whom it may concern:*

Be it known that I, L. JEROME WOOLSEY, a citizen of the United States, residing at Egypt, in the county of Monroe and State of New York, have invented a new and useful Improvement in Calendars and Almanacs, of which the following is a specification, reference being had to the accompanying drawings, forming part thereof.

All or nearly all chattels and merchandise are sold on a credit of thirty, sixty, or ninety days, and nearly all notes are made for thirty, sixty, or ninety days, making them due and payable, including the three days of grace, in thirty-three, sixty-three, or ninety-three days from date.

The object of my invention is to enable book-keepers and others to see at a glance, without computation, the day of the month and day of the week any thirty, sixty, or ninety day account or note will become due. Heretofore the date of maturity of such accounts or notes has been ascertained by actual computation, which is slow and tedious, or by approximation, which, in either case, often results in serious mistakes. The day of the week is often, if not generally, disregarded, owing to the time and trouble necessary to ascertain it. When the date of maturity desired is arrived at in the ordinary way, the wrong date is often noted, and often the date, without being noticed, falls on Sunday, either of which contingencies causes trouble, vexation, and annoyance.

My improvement attached to calendars and almanacs does away with all this trouble, loss of time, and annoyance, saves a great deal of time for the clerk or business man, shows him at a glance the day of month and day of week that any thirty, sixty, or ninety day account or note will become due, and gives him the assurance of accuracy.

Figure 1 shows a view of my improvement as attached to ordinary calendars and almanacs; H H H, upright rulings; $a\ a\ a\ a$, cross-rulings. The upright column D in Fig. 1 shows the day of week and month, as in ordinary calendars, and the upright column $h\ h\ h$ shows month, day of month, and day of week that thirty, sixty, or ninety days will fall upon, reckoning from current day of month whereunto said date and day are attached, as clearly shown in Fig. 2 at $h\ h\ h$, which is a part of my improvement.

The column $e\ e\ e$ in Fig. 1 shows month, day of month, and day of week that thirty-three, sixty-three, and ninety-three days will fall upon, added to and reckoning from the current calendar date whereunto said date and day are attached or may refer to. This is more clearly represented in Fig. 3 at $e\ e\ e$ and shows the other part of my improvement, indicating the day of maturity of any thirty, sixty, or ninety day note, including the three days of grace, reckoning as aforesaid.

Fig. 4 shows the whole of my improvement, and may be attached to calendar date in any manner desired. It is not necessary that this combination of dates should be placed at the right of calendar date of month, as in Fig. 1. It can be placed above, below, at the left, or in any other position that will show the result herein set forth.

Having described my invention, what I desire to claim and secure by Letters Patent is—

In combination with the date-columns of a calendar, and in vertical and lateral alignment therewith, a column containing the names and dates of any month and the day of the week on which a promissory note or other money obligation drawn for thirty, sixty, or ninety days from its date will fall due, together with an additional column containing similar information, with the usual three days' grace added, whereby the date of payment in each individual case can be ascertained at a glance and without the necessity of computation, all substantially as described and shown.

L. JEROME WOOLSEY.

Witnesses:
   GEORGE A. FELLOWS,
   JEREMIAH S. RAMSDELL.